United States Patent
Büchler et al.

(10) Patent No.: US 10,029,329 B2
(45) Date of Patent: Jul. 24, 2018

(54) PRESSURE WELDING DEVICE WITH A MEASURING DEVICE, MEASURING IN A CONTACTLESS MANNER, FOR DETECTING THE SURFACE QUALITY, THE TRUE RUNNING AND/OR THE AXIAL RUNOUT IN A FRONT WELDING AREA

(71) Applicant: KUKA SYSTEMS GMBH, Augsburg (DE)

(72) Inventors: Michael Büchler, Augsburg (DE); Otmar Honsberg, Fürstenfeldbruck (DE)

(73) Assignee: KUKA SYSTEMS GMBH, Augsburg (DE)

( * ) Notice: Subject to any disclaimer, the term of this patent is extended or adjusted under 35 U.S.C. 154(b) by 477 days.

(21) Appl. No.: 14/423,549

(22) PCT Filed: Jul. 30, 2013

(86) PCT No.: PCT/EP2013/066017
§ 371 (c)(1),
(2) Date: Feb. 24, 2015

(87) PCT Pub. No.: WO2014/029589
PCT Pub. Date: Feb. 27, 2014

(65) Prior Publication Data
US 2015/0298249 A1    Oct. 22, 2015

(30) Foreign Application Priority Data
Aug. 24, 2012 (DE) .................... 20 2012 103 219 U

(51) Int. Cl.
*B29C 65/06* (2006.01)
*B23K 20/12* (2006.01)
(Continued)

(52) U.S. Cl.
CPC .............. *B23K 20/121* (2013.01); *B23K 9/08* (2013.01); *B23K 9/0956* (2013.01); *B23K 31/12* (2013.01);
(Continued)

(58) Field of Classification Search
CPC .. B23K 9/0956; B23K 20/121; B23K 20/123; B23K 20/1235; B23K 20/124;
(Continued)

(56) References Cited

U.S. PATENT DOCUMENTS

| | | | | |
|---|---|---|---|---|
| 2010/0206861 A1* | 8/2010 | Rudolph | ................ | B23K 20/12 219/137 R |
| 2011/0108181 A1* | 5/2011 | Cai | ........................ | B23K 20/10 156/64 |

FOREIGN PATENT DOCUMENTS

| | | |
|---|---|---|
| DE | 37 13 418 A1 | 11/1988 |
| DE | 195 23 240 C1 | 3/1997 |

(Continued)

*Primary Examiner* — George Koch
(74) *Attorney, Agent, or Firm* — McGlew and Tuttle, P.C.

(57) ABSTRACT

A pressure welding device (1), especially a friction welding device, holds workpiece parts (2, 4) in clamping devices (6, 7) and axially moves the workpieces towards each other by means of a feed device (21). The pressure welding device (1) has a measuring device (8, 13), measuring in a contactless manner. The measuring device detects the surface condition and/or the concentricity and/or true running and/or the axial runout and/or radial runout in a front welding region (3, 5) of a workpiece part (2, 4).

23 Claims, 4 Drawing Sheets

(51) Int. Cl.
*B23K 9/08* (2006.01)
*B23K 9/095* (2006.01)
*B23K 31/12* (2006.01)
*B23K 37/00* (2006.01)
*B29C 65/00* (2006.01)
*B29L 31/00* (2006.01)

(52) U.S. Cl.
CPC .............. *B23K 37/00* (2013.01); *B29C 65/06* (2013.01); *B29C 65/0672* (2013.01); *B29C 66/90* (2013.01); *B29C 66/92311* (2013.01); *B29C 66/50* (2013.01); *B29C 66/92611* (2013.01); *B29L 2031/772* (2013.01)

(58) Field of Classification Search
CPC .. B23K 20/1245; B23K 20/125; B23K 31/12; B23K 31/125; B29C 65/06; B29C 65/0627; B29C 65/0636; B29C 65/90; B29C 66/92311; B29C 66/92611

USPC ..... 156/73.5, 73.6, 582; 228/2.1, 2.3, 112.1, 228/114.5
See application file for complete search history.

(56) References Cited

FOREIGN PATENT DOCUMENTS

| | | |
|---|---|---|
| DE | 299 22 396 U1 | 11/2000 |
| DE | 299 22 424 U1 | 5/2001 |
| DE | 10 2005 010 814 B3 | 7/2006 |
| DE | 10 2006 015 383 A1 | 10/2007 |
| DE | 10 2009 001 986 A1 | 10/2010 |
| EP | 0 101 375 A1 | 2/1984 |
| EP | 2 163 338 A1 | 3/2010 |
| JP | S63 140785 A | 6/1988 |
| JP | 2006 297398 A | 11/2006 |
| WO | 2006/002820 A2 | 1/2006 |
| WO | 2007/006669 A1 | 1/2007 |

\* cited by examiner

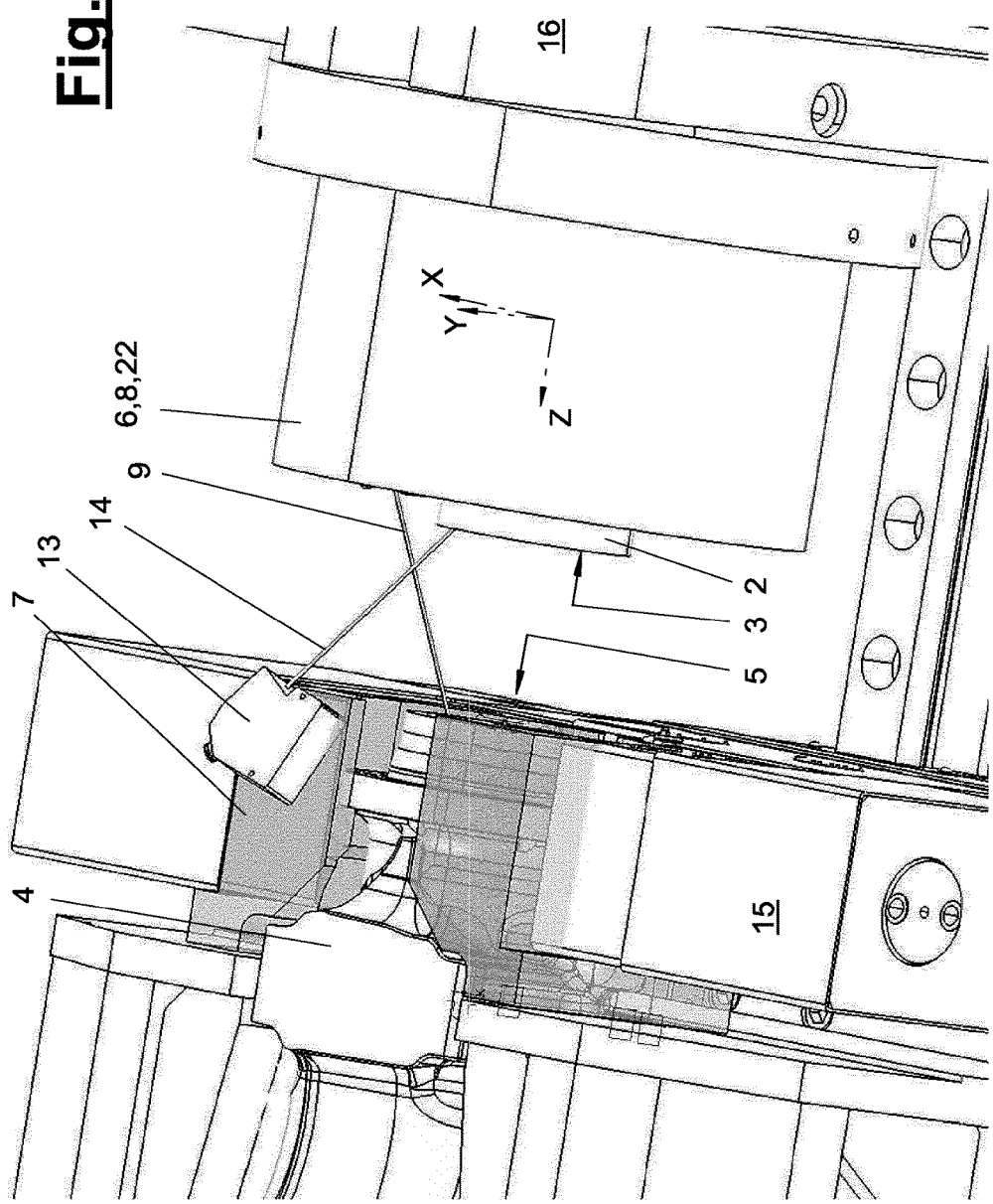

PRESSURE WELDING DEVICE WITH A MEASURING DEVICE, MEASURING IN A CONTACTLESS MANNER, FOR DETECTING THE SURFACE QUALITY, THE TRUE RUNNING AND/OR THE AXIAL RUNOUT IN A FRONT WELDING AREA

CROSS REFERENCE TO RELATED APPLICATIONS

This application is a United States National Phase Application of International Application PCT/EP2013/066017 filed Jul. 30, 2013 and claims the benefit of priority under 35 U.S.C. § 119 of German Patent Application DE 20 2012 103 219.8 filed Aug. 24, 2012, the entire contents of which are incorporated herein by reference.

FIELD OF THE INVENTION

The present invention pertains to a pressure welding device, especially a friction welding device with a plasticizing device and an upsetting (pressing) device for producing a weld joint between workpiece parts, whereby the pressure welding device has a clamping device, which is rotatable about an axis of rotation, with a rotary drive for a first workpiece part and another clamping device for another, especially second workpiece part, as well as a feeding device for bringing the clamping devices closer to each other, and the present invention relates to a pressure welding method whereby a first workpiece part is driven about an axis of rotation in a rotating manner and the workpiece parts are axially brought closer to each other by means of the feeding device.

BACKGROUND OF THE INVENTION

Such a friction welding device is known from DE 299 22 424 U1 and DE 299 22 396 U1. It has a plasticizing device and a pressing device for producing a weld joint between paired workpiece parts. The workpiece parts are plasticized in their welding areas by means of contact in the front and rotating friction under pressure and then connected with possibly increased force in an upsetting stroke. The friction welding device has a first clamping device, which is rotatable about an axis of rotation, with a rotary drive for a first workpiece part and a second clamping device for a second workpiece part as well as a feeding device for the linear adjustment of the second clamping device and for bringing the clamping devices and the workpiece parts closer to each other.

SUMMARY OF THE INVENTION

An object of the present invention is to provide an improved pressure welding technique, especially friction welding technique.

According to the invention a pressure welding device is provided with a plasticizing device and a pressing device for producing a weld joint between workpiece parts. The pressure welding device has a clamping device, which is rotatable about an axis of rotation, with a rotary drive for a first workpiece part and another clamping device for another, especially second workpiece part, as well as a feeding device for bringing the clamping devices closer to each other. The pressure welding device has a measuring device, measuring in a contactless manner, for detecting the surface quality and/or the true running and/or the axial runout in a front welding area of a workpiece part.

The pressure welding technique, and especially friction welding technique, according to the present invention makes is possible to obtain a high-quality, reproducible and loadable weld joint. It makes it possible to achieve a certain minimum quality of the surface quality and/or the axial runout and/or radial runout and/or true running and/or concentricity of the workpiece parts in relation to the axis of rotation. Consequently, it is possible to prevent the workpiece parts from possibly not contacting all over and a partial and/or nonuniform plasticizing and thus formation of a low-quality weld joint from occurring.

The pressure welding technique according to the present invention manages on a low design and control effort and a simplified kinematics. The, e.g., rotating device, which is present anyway, on one or on both adjacent clamping devices can be used for the metrological detection of the surface quality and/or the axial runout and/or true running of the front of one or both workpiece parts to be welded. A preferably contactless sensor detection, especially using a measuring beam is especially accurate, simple and reliable.

The pressure welding technique according to the present invention allows an automated checking of the workpiece parts to be welded and the automatic process sequences affected hereby. Corrections of defects can be eliminated within the pressure welding device by changing the position of and/or remachining of a workpiece part. The pressure welding device can be automated in its welding process, which may also include an automatic loading and unloading of the workpiece parts or welded workpieces as well as possibly a discharging of defective workpiece parts. Furthermore, the finished welded part may also be checked, e.g., with regard to the true running and/or axial runout of the part end or part ends.

The claimed pressure welding technique preferably pertains to friction welding with plasticizing of the contacting workpiece parts and their front surfaces under pressure and circumferentially rotating or linear or oscillating friction. As an alternative, a plasticizing by means of a magnetically moved electric arc is possible, which is first ignited between the workpiece parts and then rotates under the effect of a magnetic field. In both cases, an axial upsetting stroke may follow the plasticizing.

The term "axis of rotation" is in each case defined below as the main axis provided for producing a pressure weld joint, especially a friction weld joint, about which the first workpiece part rotates, on the one hand, and in whose direction a linear relative movement takes place between the workpiece parts, on the other hand.

A detection of the surface quality and/or of the axial runout and/or true running can be carried out with a measuring device, and especially a first measuring device on the second workpiece part in relation to the axis of rotation, while the second workpiece part is already clamped for producing the friction weld joint, i.e., in the clamped position provided for the welding. For the carrying out of a measurement, the first measuring device can be rotated about the axis of rotation, especially by means of a rotation of the first clamping device, and thereby measure the welding area of the second workpiece part. The first measuring device is preferably arranged permanently on the pressure welding device or friction welding device, especially on the first clamping device, such that it does not have to be removed for carrying out the welding. As a result of this, the surface quality and/or the true running and/or axial runout can advantageously be detected without loss of cycle time.

The first measuring device preferably has a separate power supply, which is connected with the first measuring device and is also mounted rotatably about the axis of rotation, and especially fastened to the first clamping device. By means of the power supply, the measuring device can be operated during a measurement process, without a cabling being required for the feed of power between the stationary machine frame and the rotatably mounted measuring device.

The first moved measuring device may further be connected with a control device of the friction welding device via a wireless data transmission device. Thus, a cabling may also be dispensed with for the transmission of sensor data between the measuring device and a control device of the friction welding device.

The pressure welding device or friction welding device preferably has a further, especially second measuring device for detecting the surface quality and/or the axial runout and/or true running in a welding area of the first workpiece part, which is held in the first clamping device. The second measuring device is preferably mounted linearly displaceable in the direction of the axis of rotation of the first clamping device. It can especially be fastened to the second clamping device.

In a pressure welding device or friction welding device with a first and a second measuring device of the type mentioned above, a measuring of both workpiece parts can advantageously be carried out without loss of cycle time in an automated and parallelized process. Especially a simultaneous measuring of the two workpiece parts can be carried out, whereby the first clamping device is rotated in a controlled manner and brings about the relative movement between workpiece part and measuring device for both measurement processes in each case.

In one embodiment, the pressure welding device has several pairs of clamping devices.

A permanent arrangement of a measuring device on the pressure welding device, especially friction welding device is also advantageous.

The pressure welding device may have a positioning device for the correction of a position of one or more workpiece part(s) in relation to the axis of rotation. Such a positioning device is preferably arranged on the second, axially displaceable clamping device and is provided for the second workpiece part. As an alternative or in addition, the pressure welding device may have a remachining device for a workpiece part. Further, the positioning device and/or remachining device may be automated and is/are connected with a control device of the pressure welding device.

The pressure welding device is preferably intended and designed to carry out detection of a surface quality and/or a true running and/or axial runout in a front welding area in the clamped position of the workpiece part or workpiece parts provided for producing the pressure welding.

In an especially advantageous embodiment, the pressure welding device is intended and designed to carry out an automated detection of a surface quality and/or true running and/or axial runout.

The pressure welding device is preferably also intended and designed to carry out a detection of a surface quality and/or true running and/or axial runout immediately before the beginning of a pressure welding.

The pressure welding device may be intended and designed to carry out a pressure welding only when a required quality of the surface quality and/or true running and/or the concentricity and/or axial runout and/or the radial runout is determined.

In an automated variant, the pressure welding device is intended and designed to automatically carry out a correction of the position of a workpiece part and/or a remachining of a workpiece part on the basis of the measurement results of a measuring device.

For a follow-up check, the pressure welding device and its measuring device may be intended and designed to check the pressure-welded workpiece at one or both front ends for true running and/or axial runout.

A further, independent idea of the present invention is to provide a pressure welding device with a plasticizing device and a pressing device as well as clamping devices for the workpiece parts, whereby the pressure welding device has a measuring device, which is rotatably mounted about a main axis, especially a central upsetting axis, in the area of a first workpiece part and is designed for detecting the surface quality and/or true running and/or the concentricity and/or axial runout and/or the radial runout in a front welding area of the opposing second workpiece part. This also pertains to the related method.

A plasticizing device and the pressing device may have any design here. One or more of the said clamping devices may rotate about the main axis. The measuring device may be arranged on a rotating clamping device. As an alternative, it may be arranged on its own rotation device. This may especially be the case when the clamping devices are arranged in a nonrotatable manner.

The plasticizing may be carried out by means of friction of the workpiece parts under preferably mutual contact and pressure, and especially axial pressure or by means of a circumferential and magnetically moved electric arc. In the second-named case, a mutual rotation of the workpiece parts about the main axis or upsetting axis is not necessary. The measuring device may rotate independently in this case.

The present invention is shown by way of examples and schematically in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a perspective view of a friction welding device with a first and a second measuring device.

DESCRIPTION OF THE PREFERRED EMBODIMENTS

Figure 1:
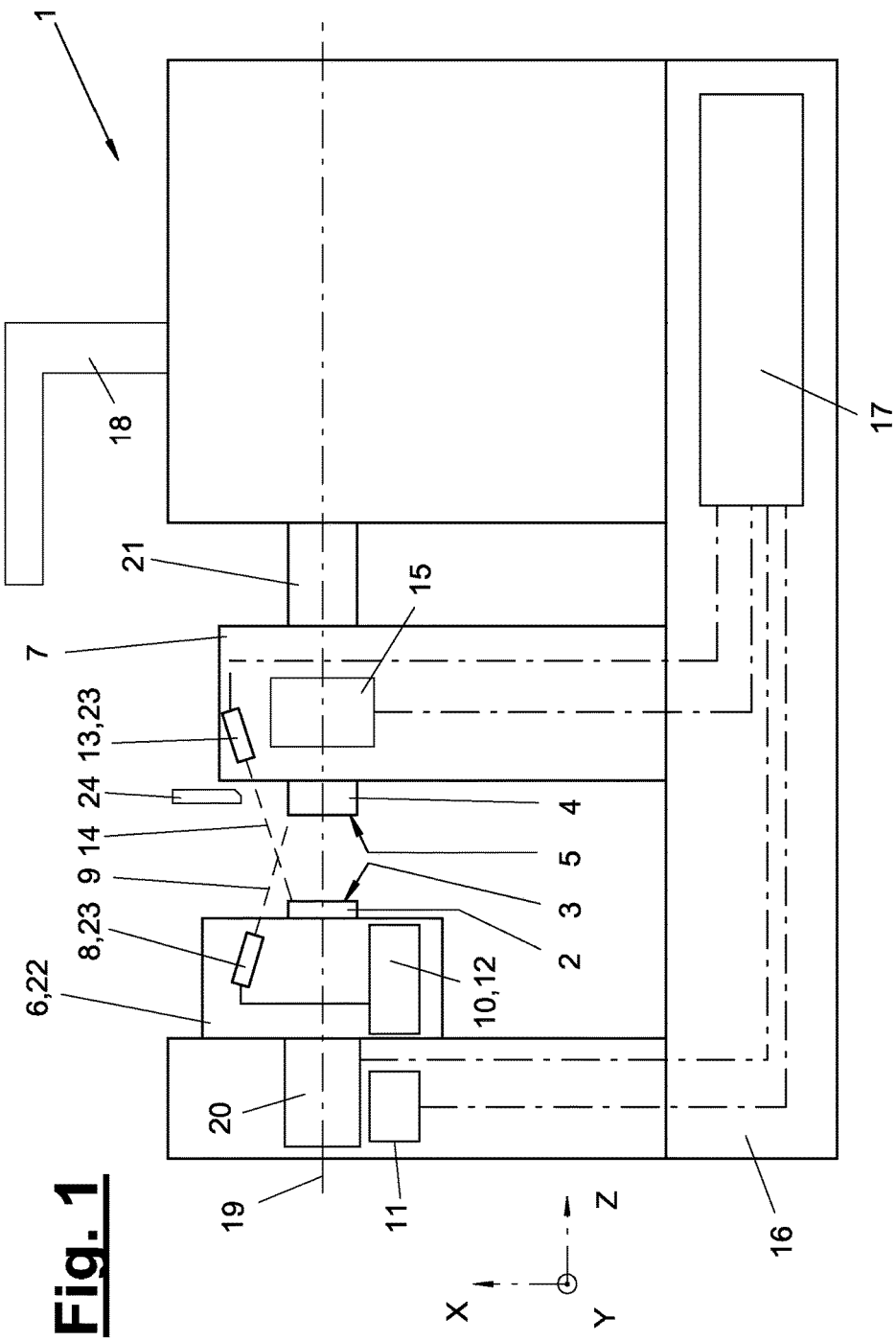
FIG. 1 is a schematic representation of a friction welding device in lateral view.

The present invention pertains to a pressure welding device, preferably a friction welding device (1), and a method for producing a weld joint between a first workpiece part (2) and a second workpiece part (4). Such a friction welding device (1) for two workpiece parts (2, 4) is schematically shown in FIG. 1. In an alternative, not shown, the pressure welding device (1) may operate with a magnetically moved electric arc.

The first workpiece part (2) and the second workpiece part (4) may consist of any materials, and especially of iron-containing or non-iron-containing metals or even of nonmetallic materials. The friction welding device (1) and the workpiece parts (2, 4) to be welded therewith may be designed, e.g., according to DE 299 22 424 U1, DE 299 22 396 U1 or DE 195 23 240 C1.

The first workpiece part (2) is held in a clamping device (6), which is rotatable about the axis of rotation (19) and actuated by a rotary drive (20). The rotary drive (20) may have a controllable motor and possibly one or more fixed or connectable flywheel masses. The second workpiece part (4) is held in a second clamping device (7).

The second clamping device (7) is preferably mounted linearly displaceable in the direction of the axis of rotation (19). The second clamping device (7) is nonrotatable in the embodiment shown. As an alternative, it may be rotatable and also have a controllable rotary drive.

The axis of rotation (19) and the axis of displacement are, e.g., horizontally aligned and extend along the machine axis (Z).

The clamping devices (6, 7) have an actuating drive and can be opened and closed automatically. In each case, they accommodate a single workpiece part (2, 4) in the center. The so-called first and rotatingly driven clamping device (6) may be designed, e.g., as an expansion chuck with a basic body (22) and a plurality of, e.g., three clamping jaws, which can be fed radially to the central axis (19). The second clamping device (7) may be designed, e.g., as a so-called self-centering chuck with a frame and two feedable clamping jaws.

The workpiece parts (2, 4) may have any shape and each possess a front, tubular or all-over welding area (3, 5), on which the plasticizing is carried out and the weld joint is produced. The welding area (3, 5) of the first and/or second workpiece part (2, 4) has preferably a rotationally symmetrical contour, especially in the form of a circular ring surface or a full circle surface. A front welding area (3, 5) is preferably symmetrical, especially concentric, and directed vertical to the axis of rotation (19). A central line of a welding area (3, 5) (intended center of a weld joint) has a preferably circular-ring-shaped design and is directed such that the central point of the central line coincides with the axis of rotation (19). In the exemplary embodiments, the workpiece parts (2, 4) are directed coaxially and in alignment with the central axes of their front surfaces or the welding areas (3, 5) for the welding process.

As an alternative, a non-rotationally symmetrical, e.g., elliptical or prismatic shape of the front surface or of the welding area (3, 5) is possible, especially when welding with a magnetically moved electric arc. The front surface or the welding area (3, 5) may have a conical design and be directed obliquely to the axis of rotation (19).

The friction welding device (1) has a machine frame (16), on which the first clamping device (6) and the second clamping device (7) are arranged and mounted. The clamping device(s) (6, 7) may be arranged in an interchangeable manner possibly by means of a changing device. The machine frame (16) may have, e.g., a horizontal machine bed and a vertical machine column. The rotary drive (20), the drives for the clamping devices (6, 7) as well as a control device (17) of the friction welding device (1) may be arranged on the machine frame (16).

A so-called first measuring device (8) is arranged on the friction welding device (1) according to FIG. 1 in the area of the first clamping device (6). It may especially be arranged on the front or circumferentially as well as rigidly or adjustably on the clamping device (6), preferably on its basic body (22). It may possibly be integrated in the clamping device (6). The first measuring device (8) is preferably designed for detecting, in a contactless manner, a front welding area (5) of the second workpiece part (4).

The first measuring device (8) has at least one sensor (23) and a device for analyzing the signals thereof. The sensor (23) detects the surface quality and/or the axial runout and/or true running of the welding area (5) of the second workpiece part (4). This may be carried out, e.g., by measuring a distance between the sensor (23) and the front of the second workpiece part (4). The sensor (23) may also direct a measuring beam (9), especially a laser beam, at the front or the welding area (5) of the second workpiece part (4). The alignment of the beam may be oblique to the axis of rotation (19). The sensor (23) may be designed here, e.g., as a light sensor. The distance measurement may be carried out by measuring the light components reflected by the weld joint (5), e.g., on the basis of a measurement of the run time or intensity. A distance measurement may also be carried out in a different way, e.g., capacitively or inductively or optically.

Such sensor detection of the surface quality and/or of the axial runout and/or true running of the front surface may further be carried out in a different way, e.g., by optical contrast measurement or the like instead of by distance measurement. The beam (9) possibly also used for this may be a light beam and be used for illuminating the detection point on the workpiece part (2).

The measuring device (8) may have a plurality of identically or differently designed sensors (23), which are arranged distributed about the axis of rotation (19). The sensor or sensors (23) may be arranged rigidly or adjustably on the clamping device (6). A sensor design, which is adjustable per se, is also possible. The sensor (23) may emit, e.g., a movable, especially oscillatingly pivotable beam (9), especially a measuring beam.

The first measuring device (8) preferably has a separate power supply (12), which may be self-sufficient and moved with it. The power supply (12) may have any design. It may especially have a battery or a storage battery. As an alternative, the power supply (12) may be a power transmission device, via which a supply power is transmitted in a contacting manner, e.g., slip ring, or contactless manner from the machine frame (16) to the rotatable measuring device (8). The contactless transmission of power may be carried out, for example, capacitively or inductively. The separate power supply (12) is rotatably mounted about the axis of rotation (19). It may be especially arranged on the first clamping device (6).

The first measuring device (8) preferably has a device (10) for wireless data transmission between the measuring device (8) and the control device (17). The wireless data transmission device (10) may be designed, for example, as a radio module and interact with a corresponding data transmission device (11) on the machine frame (16).

As an alternative, any other form of wireless data transmission may be present, for example, by means of capacitive or inductive coupling or by means of information transmission by light pulse. A wired data transmission with rotary transmitter is also possible.

Provisions are preferably made for the first measuring device (8) as well as the power supply (12) and the rotatably mounted data transmission device (10) to remain permanently on the first clamping device (6). Further, the measurement of the surface quality and/or true running and/or axial runout can be carried out largely free from environmental and disturbing effects. Thus, an especially exact and fast measurement can be carried out by means of the first measuring device (8).

The friction welding device (1) according to FIG. 1 preferably has a second measuring device (13). This measuring device may also be designed for measuring in a contactless manner and preferably be arranged permanently on the friction welding device (1). The second measuring device (13) may have any design, preferably identical to the first measuring device (8), and have one or more sensors (23), especially a light sensor. It may also emit a measuring beam (14), especially laser beam, onto the front surface and the welding area (3) of the first workpiece part (2). The second measuring device (13) may also be designed and/or arranged in an adjustable manner.

The second clamping device (7) is preferably displaceably mounted in the direction of the axis of rotation (19). It thus preferably forms the pressure generator for the plasticizing device and the pressing device. As an alternative, the second clamping device (7) may be arranged in a fixed manner, while a displaceability of the first clamping device (6) or of both clamping devices is provided.

A controllable feeding device (21) is provided for this displaceable relative movement of the clamping device(s) (6, 7). This feeding device may be designed, e.g., as a hydraulic unit, especially as a hydraulic cylinder, and may be supported, e.g., on the machine frame.

The friction welding device (1) preferably has a positioning device (15), which is arranged on the second clamping device (7), for correcting a position of the second workpiece part (4) in relation to the axis of rotation (19). The positioning device (15) may bring about a correction in the direction of a first machine radial axis (X) and/or in the direction of a second machine radial axis (Y). The first radial axis (X) corresponds, e.g., to the vertical axis of the friction welding device (1), while the second radial axis (Y) preferably corresponds to the horizontal axis of the friction welding device (1).

Figure 2:
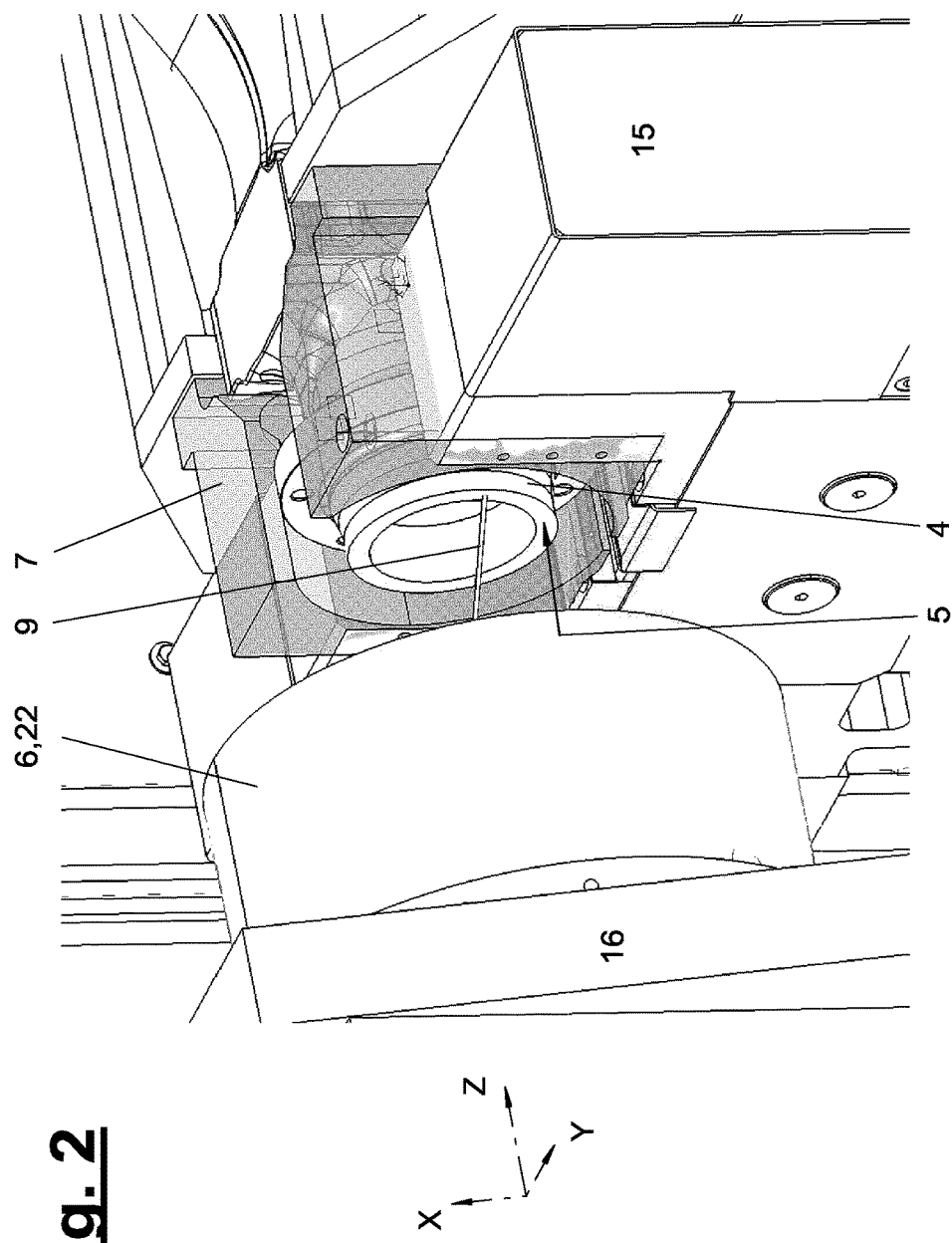
FIG. 2 is a perspective view of a first and a second clamping device with workpiece parts and a measuring device held therein.

FIG. 2 shows a cutout of the friction welding device (1) in a perspective view. On the left side is located the first rotatably mounted clamping device (6). A first workpiece part (2) (not visible) is held in this clamping device (6). Further, the first measuring device (8) is integrated in the first clamping device (6), which emits a measuring beam (9) that is oblique and possibly adjustable in inclination.

The measuring beam (9) is directed toward the front surface and the welding area (5) of the second workpiece part (4). The sensor (23) and possibly the measuring beam (9) scan the front surface in a contactless manner.

It can be hereby determined whether the front surface is flat or not and what material properties it possibly has (pockets, pores, tears, etc.). As an alternative or in addition, it is possible to detect at what angle the front surface is directed to the axis of rotation (19) or axis of displacement. The target is, e.g., a right angle. Further, a possibly lateral displacement or an eccentricity against the axis of rotation (19) or axis of displacement may be detected. All these detected factors may have an effect on the welding process and on the process quality. Limit values may be present for the acceptable quality of the surface quality and/or of the axial runout and/or true running The set and actual values may be stored with workpiece reference and recorded for quality assurance as well as output in a suitable manner. The control device (17) may have a suitable analyzing device besides memories and interfaces for this.

A detection of the surface quality and/or of the axial runout and/or the true running on the second workpiece part (4) is preferably carried out by means of a rotating movement of the first measuring device (8) about the axis of rotation (19), while the second workpiece part (4) is at rest. As a result of this, the front surface is scanned over the entire length of its circumference. Further, possibly the full width of the front surface may be scanned by a thick or a radially oscillating measuring beam (9). Provisions are especially preferably made for the first measuring device (8) to be directed, such that it measures the welding area (5), while the second workpiece part (4) is clamped in the starting position provided for producing the friction weld joint (before carrying out the feed for pressing together the two workpiece parts).

If it is determined during the detection of the surface quality and/or of the axial runout and/or true running on the second workpiece part (4) that its quality falls below a preset quality, an axial correction can be carried out by means of a positioning device (15). The axial correction may be carried out especially automatically depending on the measurement results, which were detected by the first measuring device (8). The positioning device (15) and the correction may be uniaxial or multiaxial. A remachining may also take place in case of material or surface defects of the front surface or of the welding area (3, 5).

Figure 3:
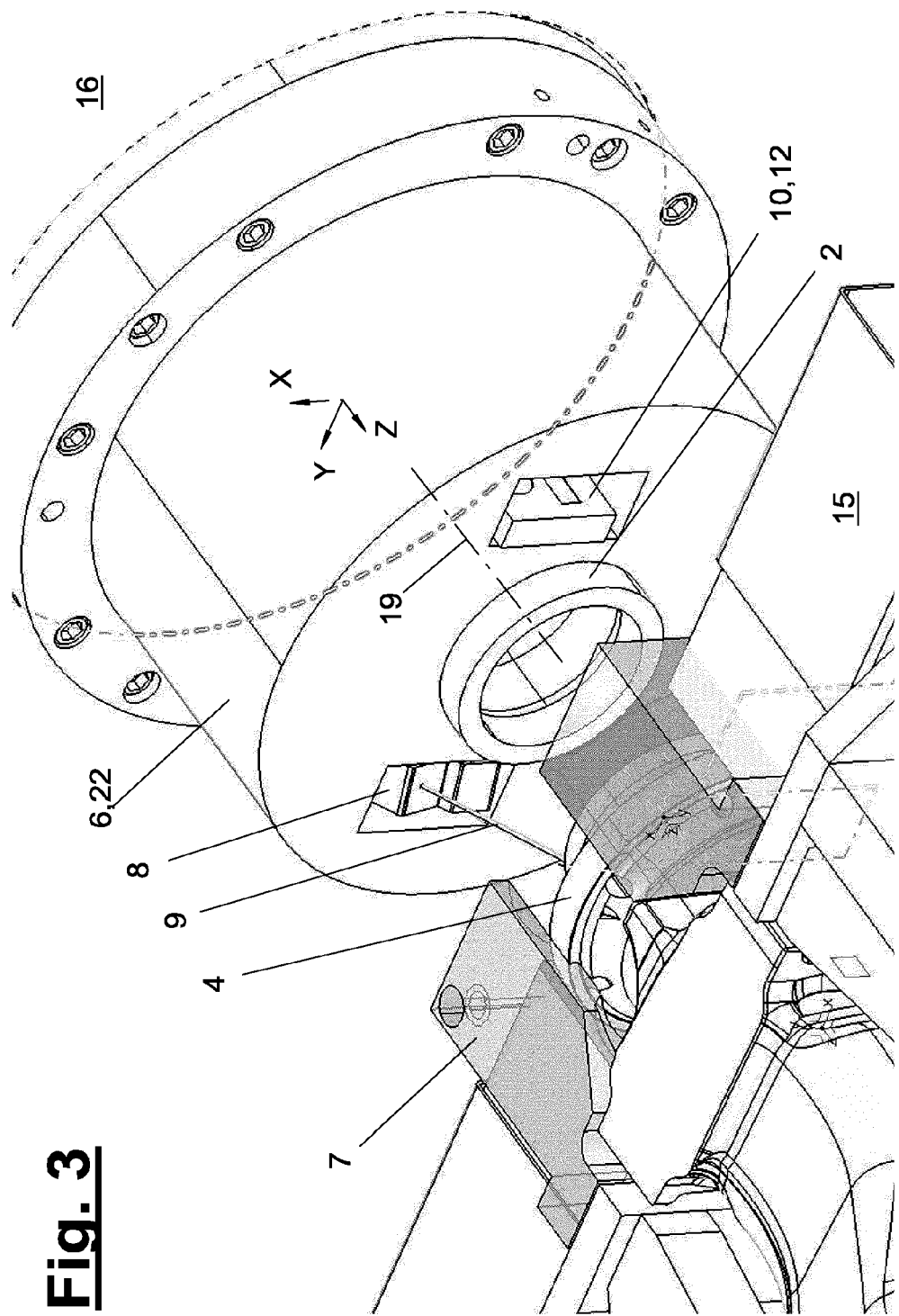
FIG. 3 is a perspective view of a first and a second clamping device with workpiece parts and a measuring device held therein.

FIG. 3 shows the friction welding device (1) from FIG. 1 with a view to the first clamping device (6) and the first workpiece part (2) clamping therein. The first measuring device (8) may preferably be integrated in the first clamping device (6), such that the measuring beam (9) emitted by the measuring device (8) is emitted to the second workpiece part (4), without the measuring beam (9) being hindered by the clamped first workpiece part (2). The first measuring device (8) may especially be arranged in the direction of a radial axis (X, Y) outside of the first workpiece part (2). Provisions are preferably made for a power supply (12) and/or a transmitter part (10) arranged on the clamping device (6) of the data transmission device to be positioned and fastened, such that these bring about a torque equilibrium against the first measuring device (8) in relation to the axis of rotation (Z).

The first measuring device (8) is preferably arranged on or in a front side of the first clamping device (6) pointing toward the second workpiece part (4). As an alternative, the first measuring device (8) may be arranged on a radial outer side of the first clamping device (6). The first measuring device (8) is arranged offset back in the direction of the axis of rotation (Z) preferably behind the front side (welding area (3)) of the first workpiece part (2) and especially behind the front side of the first clamping device (6). I.e., when the first and the second workpiece parts (2, 4) are clamped in the starting position (before carrying out the feed) provided for producing the weld joint, the distance between the first measuring device (8) and the welding area (5) of the second workpiece part (4) in the direction of the axis of rotation (19) is greater than the distance between the workpiece parts (2, 4). As a result of this, the first measuring device (8) may also remain at the given position during a carrying out of the friction welding. A collision between the first measuring device (8) and the second workpiece part (2) is ruled out.

FIG. 4 shows a friction welding device (1), in which a first measuring device (8) as well as a second measuring device (13) are provided. The first measuring device (8) as well as the arrangement thereof may correspond to the above-mentioned descriptions concerning FIGS. 1 through 3. As an alternative, the first measuring device (8) may be designed and/or arranged differently.

The second measuring device (13) is preferably arranged in the area of the second clamping device (7). As an alternative, the second measuring device (13) may be arranged on the side of the second workpiece part (4) on a section of the machine frame (16) or on a positioning device (15). The second measuring device (13) is preferably arranged, such that it can emit a measuring beam (14) onto the front welding area (3) of the first workpiece part (2), whereby this measuring beam (14) is not hindered by the second workpiece part (4). The second measuring device (13) may preferably be arranged in a radial direction (X, Y) outside of, especially above the second workpiece part (4).

The second measuring device (13) is preferably arranged offset back in the direction of the axis of rotation (19) behind the front side (welding area (5)) of the second workpiece part (4) and especially behind the front side of the second clamping device (7). Thus, the second measuring device (13) may also remain at said position during the carrying out of a friction welding and a collision with the first workpiece part (2) is ruled out.

A detection of the welding area (3) of the first workpiece part (2) is preferably carried out, such that the first workpiece part (2) is rotated by means of the first clamping device (6), while the second measuring device (13) is at rest. The detection may preferably be carried out in the clamped position provided for producing the friction weld. It is preferably carried out in an automated manner, especially immediately before the beginning of a friction welding.

Depending on the design of a friction welding device (1), the following embodiments may apply to the first measuring device (8) (i.e., for a detection of the surface quality and/or of the true running and/or axial runout on the second workpiece part (4)) or for the second measuring device (13) (i.e., for a detection of the surface quality and/or of the true running and/or axial runout on the first workpiece part (2)) or for both together.

The friction welding device (1) may preferably be designed to decide, depending on the result of the detection of the surface quality and/or of the axial runout and/or true running, whether a friction welding shall be carried out or not. Provisions may especially be made for a friction welding to be carried out only when a required quality of the surface quality and/or of the axial runout and/or true running is determined. As a result of this, an OK/not OK checking can be carried out, as a result of which defective welds are avoided. It is thus possible to prevent a friction welding from being carried out when there is fear of a low-quality formation of the weld joint.

Provisions may further be made for the required quality of the true running and/or axial runout to be able to be adjusted or readjusted by means of a correction of the position of the second workpiece part (4) in relation to the axis of rotation (19). For this, provisions may be made for the position of the second workpiece part (4) to be adapted alternatingly or continuously by means of an actuation of the positioning device (15), while its welding area (5) is measured by the first measuring device (8). The adjustment may be carried out especially by means of a control device, to which the values currently detected by the first measuring device (8) are fed as actual values.

In a friction welding device (1) that has a first measuring device (8) and a second measuring device (13), a measurement of the surface quality and/or of the axial runout and/or true running on the first workpiece part (2) and on the second workpiece part (4) can preferably be carried out in parallel. A rotation of the first clamping device (6) can thereby simultaneously bring about the rotation of the first measuring device (8) required for the measurement of the second workpiece part (4) and the rotation of the workpiece part (2) required for the measurement of the first workpiece part (2). The second workpiece part (4) and the second measuring device (13) may remain at rest during the measurement. A correction of the position of the second workpiece part (4) may possibly be carried out during or after the measurement.

The first measuring device (8) and/or the second measuring device (13) may preferably have a safety device. A safety device is preferably designed to protect a measuring device (8, 13) against damaging environmental effects such as temperature effects, radiation effects and/or foreign body effects (welding spatter), which may arise, for example, during the production of a weld joint. A safety device may especially cover an emitter area and/or a detector area of a measuring device (8, 13) and shield against welding spatter or flying chips. As an alternative, a safety device may be designed in any other way.

All design features mentioned concerning the first measuring device (8) and the advantages thereof may be transferred to the second measuring device (13) and vice versa.

In the friction welding device (1), besides the measuring devices (8, 13), the rotary drive (20) and the feeding device (21) are connected with the control device (17) as well. The rotary drive (20) may rotate, e.g., the first clamping device (6) for the measurement process at a reduced speed.

The friction welding device (1) may operate in a fully automatic manner. E.g., the loading device (18) suggested in FIG. 1 and possibly a remachining device (24), which are likewise connected with the control device (17), may be provided for this. Workpiece parts (2, 4) to be welded may be fed fully automatically with the loading device (18) and be inserted into the clamping devices (6, 7). Likewise, the finished welded workpiece may also be removed and transported away. In addition, defective workpiece parts (2, 4) may again be removed from the respective clamping device (6, 7) and be replaced with the loading device (18).

A touching up may be carried out in case of minor defects, e.g., unevennesses of the front surface or of the welding area (3, 5). This may occur by means of the remachining device (24), which has a suitable tool, e.g., a turning tool, a milling cutter or a different metal-cutting tool. Via this, a front surface can be smoothened and possibly be corrected in its angular position to the axis of rotation (19) as well.

The above-described pressure welding and detection technique can be used not only for detecting and checking the individual workpiece parts (2, 4) before the pressure welding. It is also suitable for a checking and detecting after the welding process on the finished welded workpiece. One or both front ends may be detected in this case. The above-described one or more measuring devices (8, 13) or even another and possibly additional measuring device may be used for this. For example, the clamping device (6) may be opened after the pressure welding process, whereby the other, opposing clamping device (7) with the welded workpiece may be moved back and distanced so far until the measuring device (8) on the rotating clamping device (6) can detect and check the facing front side of the finished workpiece in the above-described manner.

In another variant, the other or second clamping device (7) may be opened and moved back, whereby the second measuring device (13) then detects the front side of the welded workpiece remaining on the clamping device (6) with its renewed rotation about the axis of rotation (19) and thereby especially checks the axial runout and/or true running Separate and additional measuring devices may be provided for this in another embodiment. For the checking of the finished welded part, it may also be advantageous when the second clamping device (7) has a controllable rotary drive as well.

A variety of modifications and variants of the friction welding device according to the present invention are possible. The features of the exemplary embodiments shown and described may especially be combined in any way, replaced with one another, complemented or omitted.

In a modified pressure welding device or friction welding device (1), only one of the two measuring devices (8, 13) shown may be present. As an alternative, the number of measuring devices (8, 9) may be greater. The so-called first measuring device (8) may be arranged on the machine frame (16) in variation of the exemplary embodiments and have its own axis of rotation concentric to the axis of rotation (19). The sensor (23) may be designed here, e.g., as a circumferential laser sensor. In further variation, it is possible to arrange another alternative or additional measuring device above or next to the workpiece parts (2, 4), whereby this measuring device has a detection direction aligned obliquely to the axis of rotation (19).

Further, mechanical modifications of the pressure welding device (1) are possible. This may be designed in the above-mentioned manner as a welding device with a magnetically moved and circumferential electric arc, e.g., according to DE 37 13 418 A1. Instead of the simple friction welding device (1) with two clamping devices (6, 7) shown in FIG. 1, a so-called double-head friction welding device may be used, which has a central clamping device for a middle workpiece part and two rotatable and linearly displaceable clamping devices arranged on both sides of this for second and third workpiece parts to be welded on the outside. Such a double head friction welding device may be designed, e.g., according to WO 2006/002820 A2. Furthermore, instead of the aligned and coaxial alignment of the workpiece parts (2, 4) to be welded shown in the exemplary embodiments, a mutual oblique position may be provided, as a result of which, e.g., on a central axial body on both sides are welded axle journals with oblique alignment for the formation of a camber angle or trail angle in oblique position. Such a pressure welding device may be designed, e.g., corresponding to EP 2 163 338 A1.

While specific embodiments of the invention have been shown and described in detail to illustrate the application of the principles of the invention, it will be understood that the invention may be embodied otherwise without departing from such principles.

The invention claimed is:

1. A pressure welding device with a plasticizing device and a pressing device for producing a weld joint between workpiece parts, the pressure welding device comprising:
   a clamping device, which is rotatable about an axis of rotation;
   a rotary drive for a first workpiece part;
   another clamping device for a second workpiece part;
   a feeding device for bringing the clamping devices closer to each other; and
   a measuring device, measuring in a contactless manner, and detecting a surface quality and/or a true running and/or an axial runout in a front welding area of one of the workpiece parts prior to beginning pressure welding the first workpiece part and the second workpiece part, the first workpiece part being located at a spaced location from the second workpiece part during detection of the surface quality and/or the true running and/or the axial runout by the measuring device.

2. A pressure welding device in accordance with claim 1, wherein the measuring device is rotatably mounted about the axis of rotation and detects the surface quality and/or the true running and/or the axial runout in the front welding area of the opposing second workpiece part.

3. A pressure welding device in accordance with claim 1, wherein the pressure welding device is designed as a friction welding device and the plasticizing device is designed as a friction device, or the pressure welding device is designed as a welding device with a magnetically moved electric arc, whereby the plasticizing device is designed as an ignition and drive device for an electric arc.

4. A pressure welding device in accordance with claim 1, wherein the measuring device is arranged on the rotatable clamping device.

5. A pressure welding device in accordance with claim 1, wherein the measuring device is arranged on a basic body of the rotatable clamping device on a front or on a circumference, or integrated in the basic body.

6. A pressure welding device in accordance with claim 1, wherein the measuring device has a power supply which is carried along with the rotatable clamping device, is self-sufficient and is arranged on the rotatable clamping device.

7. A pressure welding device in accordance with claim 1, wherein the pressure welding device has a further measuring device for detecting the surface quality and/or the true running and/or the axial runout in a front welding area of the first workpiece part.

8. A pressure welding device in accordance with claim 1, wherein the measuring device is connected with a control device of the pressure welding device via a wireless data transmission device, the control device receiving a signal as input from the measuring device prior to beginning pressure welding the first workpiece part and the second workpiece part, the signal comprising the surface quality and/or the true running and/or the axial runout in the front welding area of the one of the workpiece parts.

9. A pressure welding device in accordance with claim 7, wherein the further measuring device is displaceably mounted in the direction of the axis of rotation.

10. A pressure welding device in accordance with claim 1, wherein the further measuring device is arranged on the second clamping device displaceably mounted and driven in a direction of the axis of rotation.

11. A pressure welding device in accordance with claim 1, wherein the measuring device has one or more sensors measuring in a contactless manner, with an analysis device.

12. A pressure welding device in accordance with claim 11, wherein the one or more sensor measures the distance to the front welding area of the opposing workpiece part.

13. A pressure welding device in accordance with claim 11, wherein the one or more sensor emits a measuring beam or a laser beam, to a front welding area of the opposing workpiece part.

14. A pressure welding device in accordance with claim 11, wherein the one or more sensor is designed as adjustable sensor and/or is arranged on the clamping device in an adjustable manner.

15. A pressure welding device in accordance with claim 8, further comprising an automatic loading device feeding individual workpiece parts and discharging a welded workpiece wherein the clamping devices, which are driven and connected with the control device, comprise an expansion chuck or self-centering chuck.

16. A pressure welding device in accordance with claim 8, further comprising a positioning device, the control comparing the surface quality and/or the true running and/or the axial runout with a predetermined threshold, the control sending a control signal to the positioning device when the surface quality and/or the true running and/or the axial runout is below the predetermined threshold for correcting a position of one of the workpiece parts in relation to the axis of rotation and/or a remachining device for one of the workpiece part.

17. A pressure welding device with a plasticizing device and a pressing device for producing a weld joint between workpiece parts, the pressure welding device comprising:
   a clamping device, which is rotatable about an axis of rotation;
   a rotary drive for a first workpiece part;
   another clamping device for a second workpiece part;
   a feeding device for bringing the clamping devices closer to each other;
   a measuring device, measuring in a contactless manner, and detecting a surface quality and/or a true running and/or an axial runout in a front welding area of one of the workpiece parts, wherein the pressure welding device is designed as a welding device with a magnetically moved electric arc, wherein the plasticizing device is designed as an ignition and drive device for an electric arc.

18. A welding device in accordance with claim 17, wherein the measuring device is rotatably mounted about the axis of rotation and detects the surface quality and/or the true running and/or the axial runout in the front welding area of the opposing second workpiece part.

19. A pressure welding device in accordance with claim 17, wherein the pressure welding device has a further measuring device for detecting the surface quality and/or the true running and/or the axial runout in a front welding area of the first workpiece part.

20. A pressure welding device in accordance with claim 17, wherein the measuring device measures the distance to the front welding area of the opposing workpiece part.

21. A pressure welding device in accordance with claim 17, wherein the measuring device emits a measuring beam or a laser beam, to a front welding area of the opposing workpiece part.

22. A pressure welding device in accordance with claim 17, further comprising a positioning device for correcting a position of one of the workpiece parts in relation to the axis of rotation and/or a remachining device for one of the workpiece part.

23. A pressure welding device with a plasticizing device and a pressing device for producing a weld joint between workpiece parts, the pressure welding device comprising:
   a clamping device, which is rotatable about an axis of rotation;
   a rotary drive for a first workpiece part;
   another clamping device for a second workpiece part;
   a feeding device for bringing the clamping devices closer to each other; and
   a measuring device, measuring in a contactless manner, and detecting a surface quality and/or a true running and/or an axial runout in a front welding area of one of the first workpiece part and the second workpiece part prior to starting pressure welding the first workpiece part and the second workpiece part, the first workpiece part being located at a spaced location from the second workpiece part during detection of the surface quality and/or the true running and/or the axial runout by the measuring device, the measuring device being fixed to one of the clamping device and the another clamping device, the one of the clamping device and the another clamping device being located at a spaced location from the one of the first workpiece part and the second workpiece part, the measuring device emitting a measuring beam, the measuring beam traveling along a measuring beam path, the measuring beam path extending from the one of the clamping device and the another clamping device to the one of the first workpiece part and the second workpiece part, wherein a portion of the measuring beam path extends between a space defined by the first workpiece part and the second workpiece part.

* * * * *